(12) United States Patent
Huang et al.

(10) Patent No.: US 8,754,891 B2
(45) Date of Patent: *Jun. 17, 2014

(54) METHOD FOR IMAGE PROCESSING AND AN APPARATUS THEREOF

(75) Inventors: Wei-Jia Huang, Puli Township, Nantou County (TW); Kai-Che Liu, Kaohsiung (TW); Chia-Hang Ho, Taipei (TW); Chun-Te Wu, Taoyuan (TW); Feng-Hsiang Lo, Jhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 452 days.

This patent is subject to a terminal disclaimer.

(21) Appl. No.: 13/152,093

(22) Filed: Jun. 2, 2011

(65) Prior Publication Data

US 2012/0044244 A1 Feb. 23, 2012

Related U.S. Application Data

(60) Provisional application No. 61/374,735, filed on Aug. 18, 2010.

(30) Foreign Application Priority Data

Dec. 24, 2010 (TW) .............................. 99145926 A (51) Int. Cl.
*G06T 11/20* (2006.01)
(52) U.S. Cl.
USPC ........... 345/440; 345/422; 345/427; 345/616; 382/154; 382/226; 703/14; 703/21; 703/22
(58) Field of Classification Search
None
See application file for complete search history.

(56) References Cited

U.S. PATENT DOCUMENTS 6,930,685 B1 8/2005 Sakagawa et al.
7,146,059 B1 12/2006 Durand et al.

(Continued)

FOREIGN PATENT DOCUMENTS

EP 1074943 A3 3/2004
TW 200804941 A 1/2008

(Continued)

OTHER PUBLICATIONS

Grady, L.; "Random Walks for Image Segmentation;" IEEE Transaction on Pattern Analysis and Machine Intelligence; vol. 28; No. 11; Nov. 2006; pp. 1-17.

(Continued)

*Primary Examiner* — Antonio A Cashera
(74) *Attorney, Agent, or Firm* — McClure, Qualey & Rodack, LLP (57) ABSTRACT

An image processing method includes the following steps. An input data including a number of original data are received. The original data are converted into a number of converted emulation voltage signals. At least a simulation circuit model including at least a spatial data node, at least a diffusion node and at least a connection device is established, wherein, the at least a connection device is coupled to a part or all of the at least a spatial data node and the at least a diffusion node. A part or all of the converted emulation voltage signals are supplied to the diffusion node to achieve voltage diffusion among the spatial data nodes and the diffusion nodes via the connection device, so that at least a diffused emulation voltage signal is obtained on the diffusion nodes. Then, processed image data are generated according to the diffused emulation voltage signals.

34 Claims, 8 Drawing Sheets

(56) References Cited

U.S. PATENT DOCUMENTS

| | | |
|---|---|---|
| 7,486,820 B2 | 2/2009 | Grady |
| 7,565,010 B2 | 7/2009 | Grady |
| 7,570,804 B2 | 8/2009 | Kim et al. |
| 7,729,537 B2 | 6/2010 | Grady et al. |
| 8,218,854 B2 | 7/2012 | Liu et al. |
| 8,514,269 B2 * | 8/2013 | Adler et al. .................... 348/46 |

FOREIGN PATENT DOCUMENTS

| | | |
|---|---|---|
| TW | 200825621 A | 6/2008 |
| TW | 200933491 | 8/2009 |
| WO | 2008111080 A1 | 9/2008 |
| WO | PCT/CN2009/075007 | 5/2011 |

OTHER PUBLICATIONS

Scharshtein, D., et al.; "A Taxonomy and Evaluation of Dense Two-Frame Stereo Correspondence Algorithms;" Nov. 2001; pp. 1-61.

Hirschmuller, H.; "Accurate and Efficient Stero Processing by Semi-Global Matching and Mutual Information;" IEEE Conference on Computer Vision and Pattern Recognition; Jun. 2005; pp. 1-8.

TW Office Action dated Mar. 10, 2014.

English Abstract translation of TW200804941 (Published Jan. 16, 2008).

* cited by examiner

METHOD FOR IMAGE PROCESSING AND AN APPARATUS THEREOF

This application claims the benefit of U.S. provisional application No. 61/374,735, filed Aug. 18, 2010, and Taiwan application Serial No. 99145926, filed Dec. 24, 2010, the subject matter of which are incorporated herein by reference.

BACKGROUND

1. Technical Field

The disclosure relates in general to a method and an apparatus thereof for processing image via circuit model simulation, and the embodiments of the method and the apparatus thereof include related image processing such as the operations for generating depth data, smoothing image and scaling image resolution.

2. Description of the Related Art

As science and technology advance rapidly, stereo image multimedia systems have gained increasing attention of the related industries. In general, the image processing technologies such as the single view to depth conversion technology and the stereo matching technology have always been the core of multi-view synthesis technologies.

According to the single view to depth conversion technology, conventional 2D monocular view images are converted into depth for further multi-view synthesis. According to the stereo matching technology, a depth map is calculated based on matching points between the stereo images. The depth generated from both methods could be used for multi-view image synthesis by the depth image based rendering (DIBR) method.

In general, the accuracy of the depth data is crucial to the quality of multi-view image data. Therefore, how to provide an image processing method capable of generating depth data with higher accuracy has become a prominent task for the industries.

SUMMARY

According to a first aspect of the present disclosure, an image processing method executed by a computer is provided. Firstly, input data including a number of original data are received using the computer. Next, the original data are converted into a number of converted emulation voltage signals using the computer. Then, at least a simulation circuit model including at least a spatial data node, at least a diffusion node and at least a connection device is established using the computer, wherein, the at least a connection device is coupled to a part or all of the at least a spatial data node and the at least a diffusion node. Afterwards, a part or all of the converted emulation voltage signals are supplied using the computer to the at least a spatial data node to achieve voltage diffusion among the at least a spatial data node and the at least a diffusion node via the at least a connection device, so that at least a diffused emulation voltage signal is obtained on the at least a diffusion node. After that, processed image data are generated according to the diffused emulation voltage signals using the computer.

According to a second aspect of the present disclosure, an image processing apparatus is provided. The apparatus includes an input unit, a conversion unit, a simulation unit and a control unit. Input data including a number of original data are received by the input unit. The original data are converted into a number of converted emulation voltage signals by the conversion unit. At least a simulation circuit model is established by the simulation unit which includes at least a data node, at least a diffusion node and at least a connection device, wherein at least a connection device is coupled to a part or all of the at least a spatial data node and the at least a diffusion node. A part or all of the converted emulation voltage signals are supplied to the at least a spatial data node by the control unit to achieve voltage diffusion among the at least a spatial data node and the at least a diffusion node via at least a connection device, so that at least a diffused emulation voltage signal is obtained on the at least a diffusion node. The simulation unit processed image data are generated according to the diffused emulation voltage signals.

The above and other aspects of the disclosure will become better understood with regard to the following detailed description of the non-limiting embodiment(s). The following description is made with reference to the accompanying drawings.

DETAILED DESCRIPTION

The image processing apparatus and method of the present embodiment of the disclosure perform related image processing through circuit model simulation.

Figure 1:
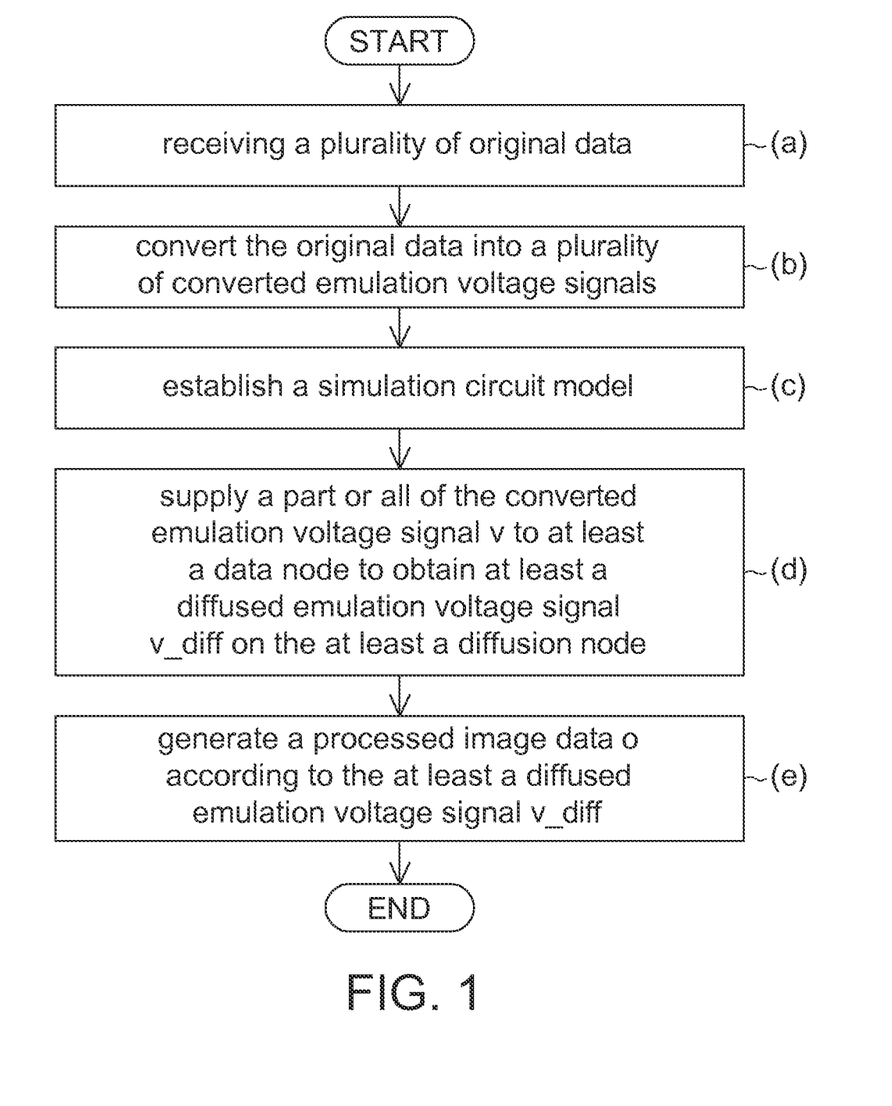
FIG. 1 shows a flowchart of an image processing method according to an embodiment of the disclosure.

Referring to FIG. 1, a flowchart of an image processing method according to an embodiment of the disclosure is shown. The image processing method of the present embodiment of the disclosure includes the following steps. Firstly, as indicated in step (a), input data including a number of original data DV and Di are received using a computer. Next, as indicated in step (b), the original data are converted into a number of converted emulation voltage signals v using the computer. Then, as indicated in step (c), at least a simulation circuit model, including at least a spatial data node, at least a diffusion node and at least a connection device, is established using the computer, wherein the at least a connection device is coupled between the at least a spatial data node and the at least a diffusion node.

Afterwards, as indicated in step (d), a part or all of the converted emulation voltage signals v are supplied to the at least a spatial data node to achieve voltage diffusion among the at least a spatial data node and the at least a diffusion node via the at least a connection device using the computer, so that at least a diffused emulation voltage signal is obtained on the at least a diffusion node v_diff. After that, as indicated in step (e), processed image data o are generated according to the at least a diffused emulation voltage signal v_diff using the computer.

A number of embodiments are exemplified below for elaborating the image processing method of the embodiments of the present disclosure.

First Embodiment

The image processing method of the present embodiment of the disclosure is used in the single view to depth conversion technology for generating depth distribution data according to initial depth data and 2D image.

Figure 2:
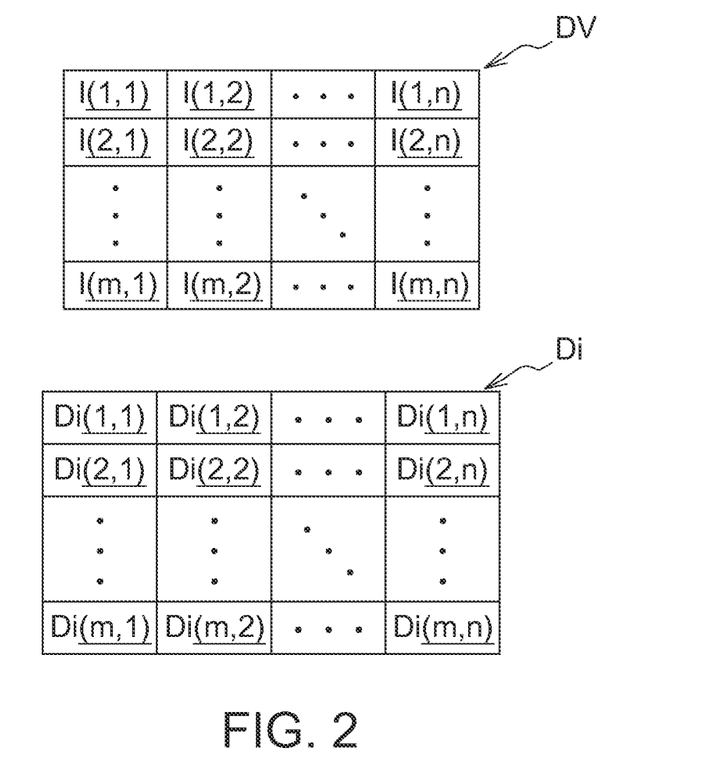
FIG. 2 is a diagram showing input data according to a first embodiment of the disclosure.

Referring to FIG. 2, an illustration of input data according to a first embodiment of the disclosure is shown. According to the image processing method of the present embodiment of the disclosure, depth distribution data Do are generated according to the input data DV and Di. For example, the input data Di include m×n original data Di(1,1), Di(1,2), Di(1,3), . . . , Di(m,n), wherein m and n are natural numbers greater than 1. The input data Di correspond to the image data DV shown on the display. The image data DV include m×n pixel data I(1,1), I(1,2), . . . , I(m,n), wherein m×n original data Di(1,1-)-Di(m,n) respectively correspond to the m×n pixel data I(1,1)-I(m,n) of the m×n pixels shown on the display. In the present embodiment of the disclosure, the input data Di are the initial depth data corresponding to the image data DV, the numeric value of each of the m×n original data Di(1,1)-Di(m,n) respectively indicates the depth of each of the corresponding m×n pixel data. The depth distribution data Do have higher accuracy and are generated according to the initial depth data of the image data DV.

Thus, the image processing method of the present embodiment of the disclosure is used for generating depth data according to two dimensional (2D) image data DV and the initial depth data. In other words, the image processing method of the present embodiment of the disclosure is used for converting 2D image content into depth.

For example, the m×n original data Di(1,1)-Di(m,n) respectively include m×n 8-bit data. In other words, each of the original data Di(1,1)-Di(m,n) has a numeric value ranging between 0-255. The greater values the original data Di(1,1)-Di(m,n) correspond, the smaller depths the corresponding pixel data I(1,1)-I(m,n) will have. The smaller values the original data Di(1,1)-Di(m,n,) correspond, the greater depths the corresponding pixel data I(1,1)-I(m,n) will have.

Figure 3:
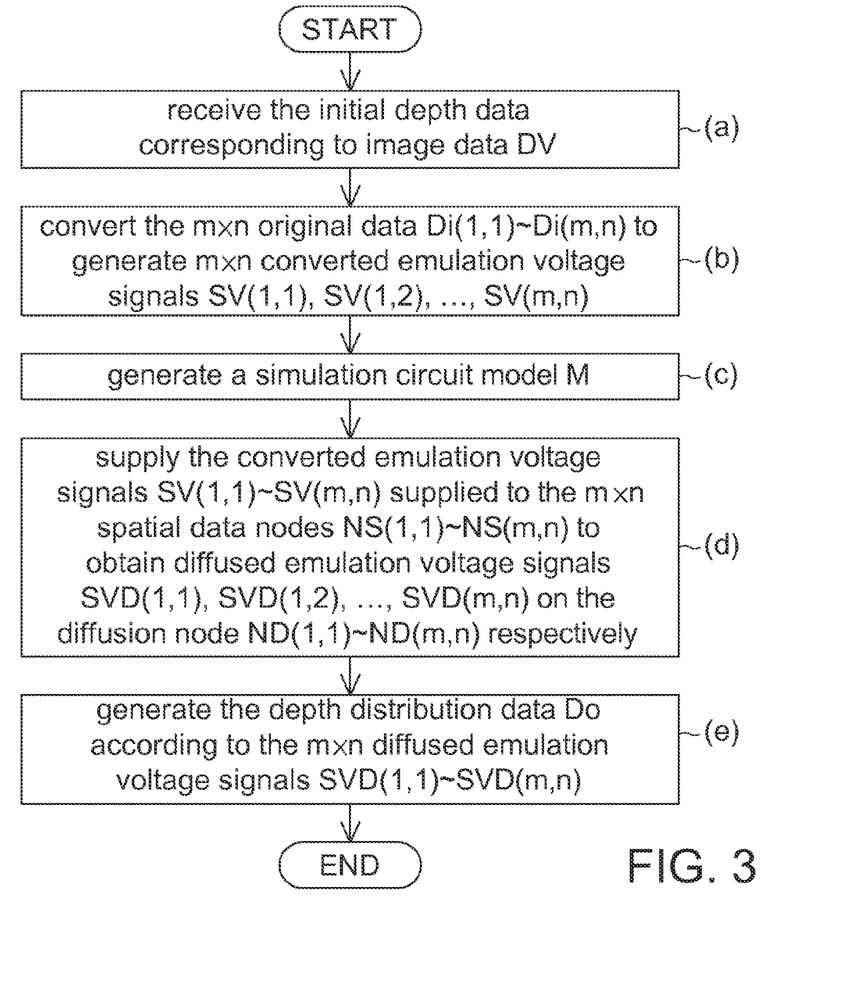
FIG. 3 shows a flowchart of an image processing method according to a first embodiment of the disclosure.

Referring to FIG. 3, a flowchart of an image processing method according to a first embodiment of the disclosure is shown. Firstly, as indicated in step (a), the initial depth data corresponding to image data DV are received using a computer, and m×n pixel depth data of the initial depth data are employed as m×n original data Di(1,1)-Di(m,n). Next, as indicated in step (b), the m×n original data Di(1,1)-Di(m,n) are converted, using the computer, to generate m×n converted emulation voltage signals SV(1,1), SV(1,2), . . . , SV(m,n) corresponding to the m×n original data Di(1,1)-Di(m,n) respectively. For example, in the conversion step (b), the numeric value of each of the original data Di(1,1)-Di(m,n) is directly used as the numeric voltage value of each of the converted emulation voltage signals SV(1,1)-SV(m,n).

Figure 5:
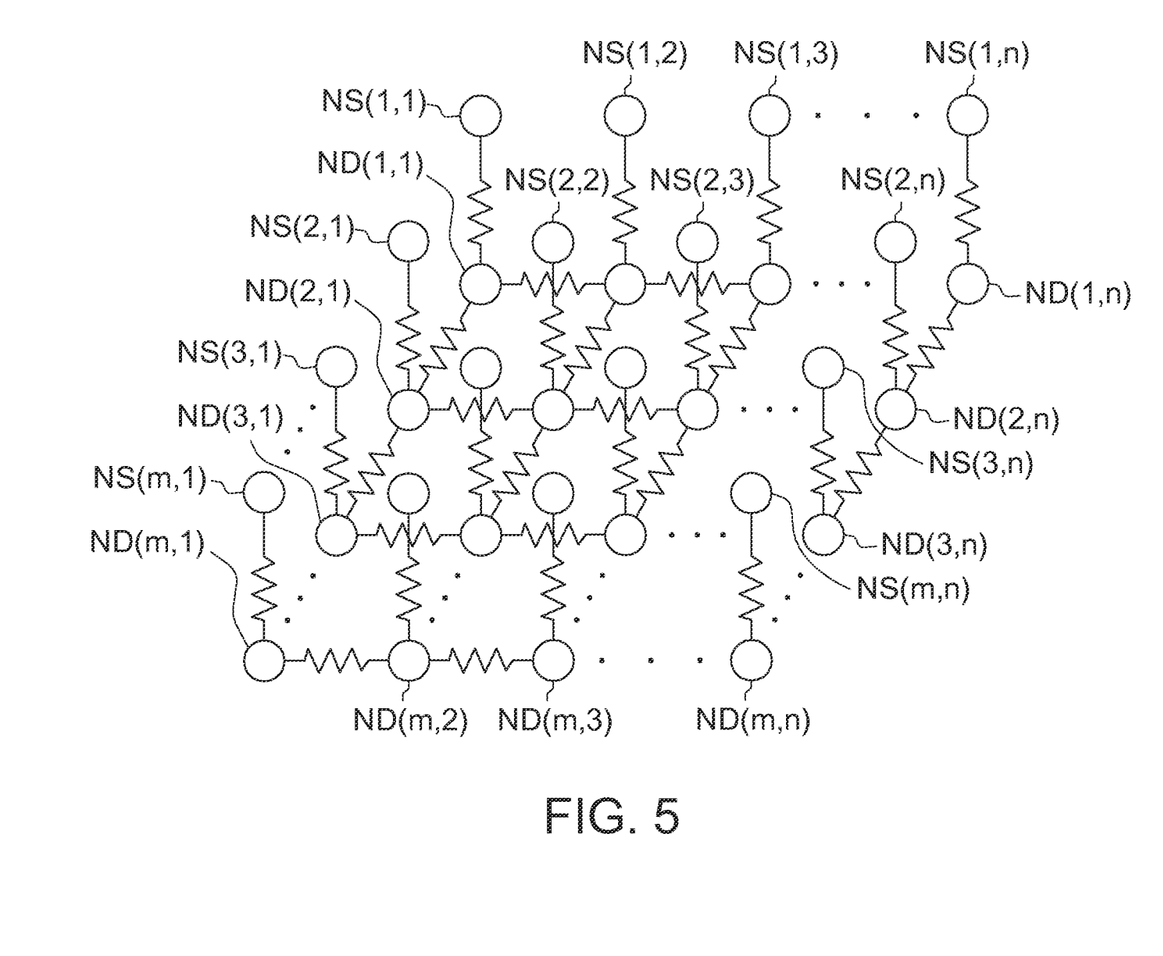
FIG. 5 shows a circuit diagram of a simulation circuit model according to a first embodiment of the disclosure.

Then, as indicated in step (c), a simulation circuit model M, including at least a spatial data node, at least a diffusion node and at least a connection device, is established using the computer. In an operating example, the simulation circuit model M, as illustrated in FIG. 5, includes m×n sub-circuit models M(1,1), M(1,2), . . . , M(m,n) having similar circuit structures and respectively corresponding to the m×n original data Di(1,1)-Di(m,n). Since the m×n sub-circuit models have similar circuit structures, herein below, the sub-circuit models M(1,1)-M(m,n) of the simulation circuit model M are only exemplified by the sub-circuit model M(i,j) corresponding to the original data Di(i,j), wherein i and j are a natural number smaller than or equal to m and a natural number smaller than or equal to n, respectively.

Figure 4:
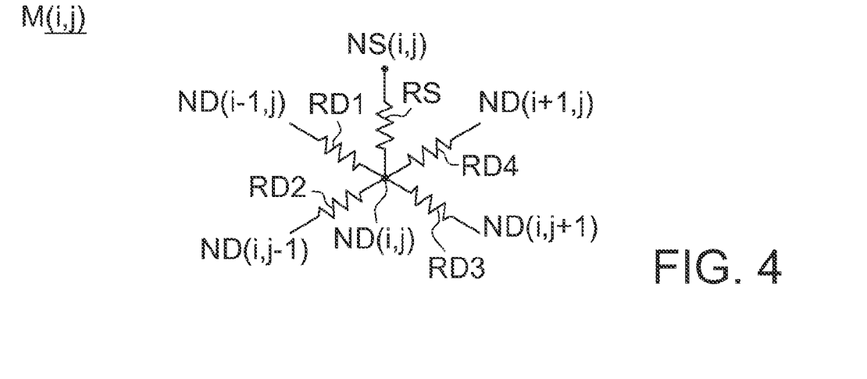
FIG. 4 shows a circuit diagram of a sub-circuit model according to a first embodiment of the disclosure.

Referring to FIG. 4, a circuit diagram of a sub-circuit model M(i,j) according to a first embodiment of the disclosure is shown. The sub-circuit model M(i,j) includes a number of spatial data nodes NS(i,j), a number of diffusion nodes ND(i,j), a spatial data connection device RS and z diffused connection devices RD1, RD2, . . . , RDz, wherein z is a natural number, and the spatial data connection device RS and the diffused connection devices RD1-RDz are realized by, e.g. resistance model elements. In step (c), the spatial data connection device RS is coupled between the spatial data nodes NS(i,j) and the diffusion nodes ND(i,j), and one end of each of the z diffused connection devices RD1-RDz is coupled to the diffusion node ND(i,j), while the other end is coupled to the diffusion node of another sub-circuit model of the simulation circuit model M.

In the example of FIG. 4, z is equal to 4. In step (c), the other ends of the diffused connection devices RD1-RD4 are coupled to the diffusion nodes ND(i−1,j), ND(i,j−1), ND(i,j+1) and ND(i+1,j) of the sub-circuit models M(i−1,j), M(i,j−1), M(i,j+1) and M(i+1,j) respectively. By the same analogy, in step (c), all m×n diffusion nodes ND(1,1)-ND(m,n) of the m×n sub-circuit models M(1,1)-M(m,n) are coupled via corresponding diffused connection devices, so that the sub-circuit models M(1,1)-M(m,n) of the simulation circuit model M are connected to form a resistor network as illustrated in FIG. 5.

For example, the resistance values of the spatial data diffused connection devices RS(1,1)-RS(m,n) of the simulation circuit models M(1,1)-M(m,n) are substantially equal, fixed, and determined by the user.

For example, the resistance value $\omega_{diffuse}$ of each of the z diffused connection devices RD1-RDz of the simulation circuit model M(i,j) satisfies the following equation:

$$\omega_{diffuse} = \frac{\alpha}{e^{-\beta \|C_t - C_n\|^2}}$$

Wherein, $\alpha$ and $\beta$ denote predetermined parameters; $C_t$ denotes the color information of the corresponding pixel data of the original data Di(i,j); $C_n$ denotes the color information of the corresponding pixel data of each of the original data on the diffusion nodes (that is, ND(i−1,j), ND(i,j−1), ND(i,j+1) and ND(i+1,j)) coupled by the diffused connection devices RD1-RDz. For example, the color information $C_t$ and $C_n$ of the pixel data can be obtained from the sum of the absolute values of the sub-pixel data of each color of the corresponding pixel data.

Afterwards, as indicated in step (d), the converted emulation voltage signals SV(1,1)-SV(m,n) corresponding to the m×n original data Di(1,1)-Di(m,n) are respectively supplied to the m×n spatial data nodes NS(1,1)-NS(m,n) to achieve voltage diffusion among the spatial data connection devices and the diffused connection devices of the simulation circuit model M for driving the m×n sub-circuit models M(1,1)-M(m,n) to incur the redistribution of voltage levels, so that m×n diffused emulation voltage signals SVD(1,1), SVD(1,2), . . . , SVD(m,n) are respectively obtained on the diffusion node ND(1,1)-ND(m,n).

After that, as indicated in step (e), depth distribution data Do are generated, using the computer, according to the m×n diffused emulation voltage signals SVD(1,1)-SVD(m,n).

In step (a) of the image processing method of the present embodiment of the disclosure, the numeric value of each of the original data Di(1,1)-Di(m,n) is directly used as the numeric voltage value of each of the converted emulation voltage signals SV(1,1)-SV(m,n). However, such exemplification is for elaboration purpose only, and the image processing method of the present embodiment of the disclosure is not limited thereto.

In other examples, when the image data DV are dynamic video data, the image processing method of the present embodiment of the disclosure can generate corresponding converted emulation voltage signals SV(x,y) from the original data Di(x,y) according to the following formula:

$$SV(x,y) = \gamma \times Di_{pre}(x,y) + (1-\gamma) \times Di(x,y)$$

Wherein x and y respectively denote a natural number smaller than or equal to m and a natural number smaller than or equal to n; $\gamma$ denotes a predetermined parameter; $Di_{pre}(x,y)$ denotes the depth data of the pixel data I(x,y) of the previous image data corresponding to the previous frame time; wherein x and y respectively denote a natural number smaller than or equal to m and a natural number smaller than or equal to n. Through the above operation, the image processing method of the present embodiment of the disclosure can increase depth contrast of the depth distribution data Do.

In still another example, the image processing method of the present embodiment of the disclosure can emphasize the depth of moving object by superimposing an intensifying voltage on the spatial data node NS (originally, the spatial data node NS has a converted emulation voltage signal SV). For example, the image processing method of the present embodiment of the disclosure superimposes the intensifying voltage on the spatial data node NS according to the following formula:

$$SV(x,y) = Di(x,y) + \min(\delta, \kappa |C_{pre}(x,y) - C_{cur}(x,y)|)$$

Wherein, $\min(\delta, \kappa |C_{pre}(x,y) - C_{cur}(x,y)|)$ denotes the intensifying voltage value to be superimposed on the converted emulation voltage signal SV; $\kappa$ denotes a predetermined parameter; $\delta$ denotes an upper limit of the intensifying voltage value; $C_{pre}(x,y)$ and $C_{cur}(x,y)$ denote the color of the pixel data at the position (x,y) at the previous frame time and the current frame time respectively.

In the present embodiment of the disclosure, the number of the sub-circuit model M(1,1)-M(m,n) of the simulation circuit model M is substantially equal to that of the original data Di(1,1)-Di(m,n), and the corresponding converted emulation voltage signals SV(1,1)-SV(m,n) of the original data Di(1,1)-Di(m,n) are respectively received by the data nodes NS(1,1)-NS(m,n) of the sub-circuit models M(1,1)-M(m,n). However, the image processing method of the present embodiment of the disclosure is not limited to such exemplification. In other examples, the simulation circuit model generated in step (c) of the image processing method may include a number of sub-circuit models whose number is not equal to that of the original data. In correspondence, the user can also input a part or all of the original data Di(1,1)-Di(m,n) to the simulation circuit model M to obtain processed image data by making a part of the data nodes floating or discarding a part of the original data, or through similar operations.

Second Embodiment

The image processing method of the present embodiment of the disclosure is used in the stereo matching technology for generating depth distribution data according to the first and the second viewangle image data.

Figure 6:
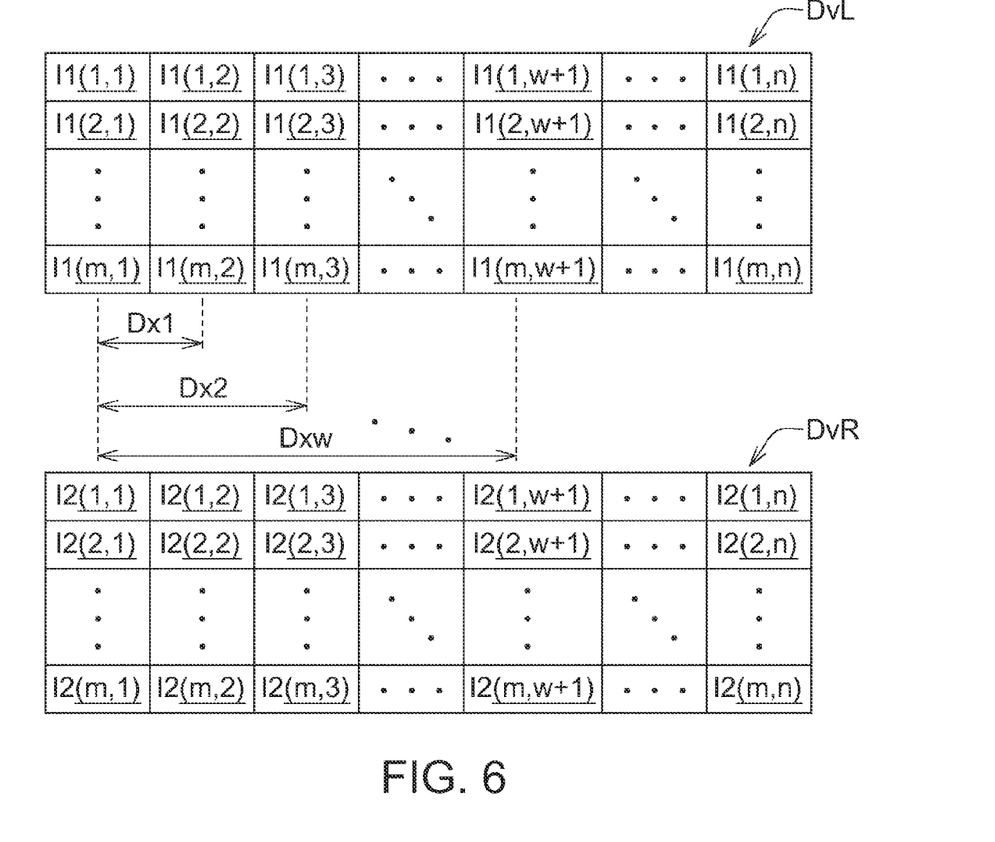
FIG. 6 is a diagram showing input data according to a second embodiment of the disclosure.

Referring to FIG. 6, a diagram showing input data according to a second embodiment of the disclosure is shown. In the present embodiment of the disclosure, the input data Di' are parallax data corresponding to the first viewangle image data DvL and the second viewangle image data DvR, and the depth distribution data Do' correspond to the first viewangle image data DvL or the second viewangle image data DvR. The image processing method of the present embodiment of the disclosure is used for generating corresponding depth distribution data according to the parallax data of the first and the second viewangle image data DvL and DvR. In other words, the image processing method of the present embodiment of the disclosure is used for matching binocular view images.

Figure 7A:
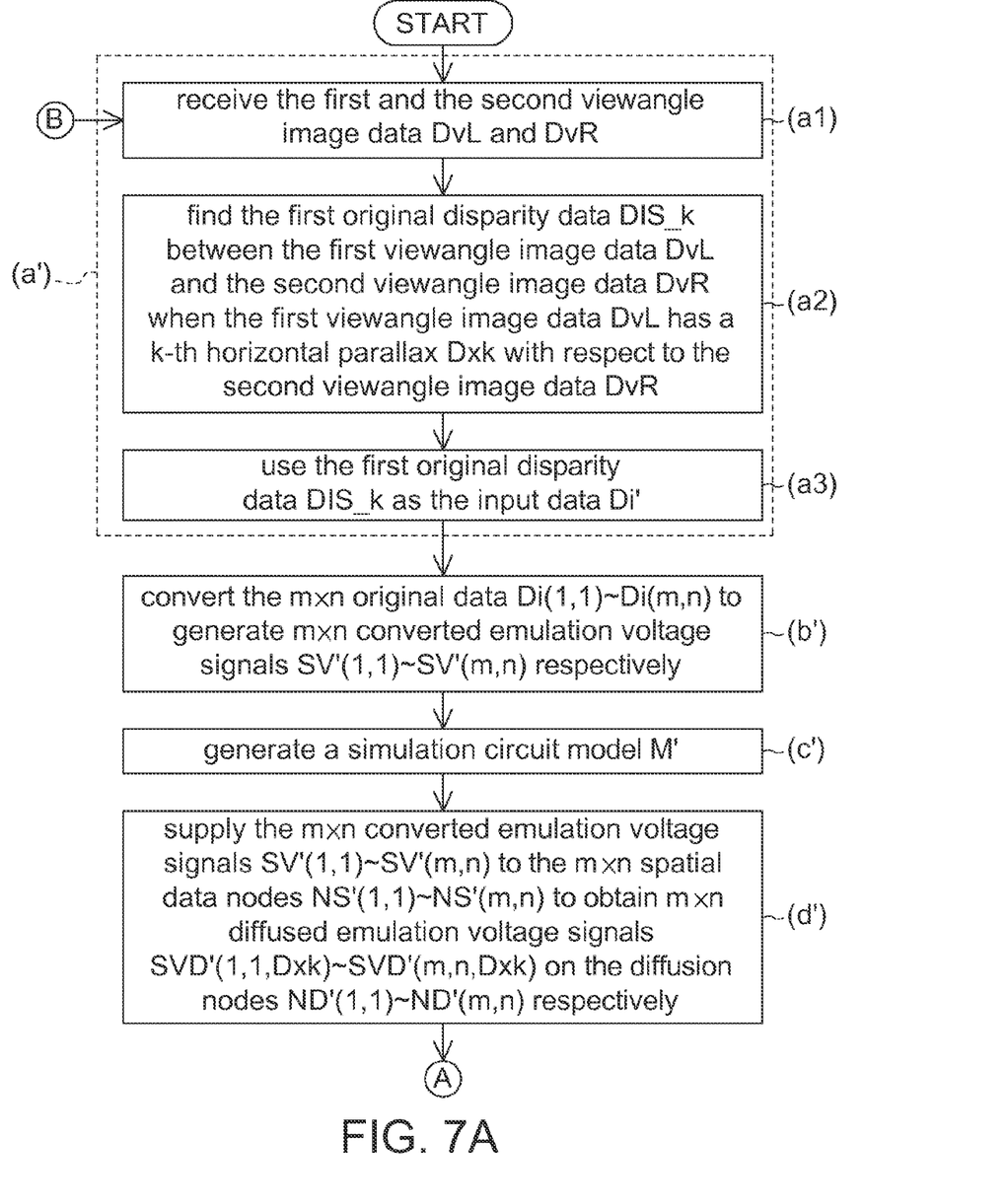
FIGS. 7A and 7B shows a flowchart of an image processing method according to a second embodiment of the disclosure.
Figure 7B:
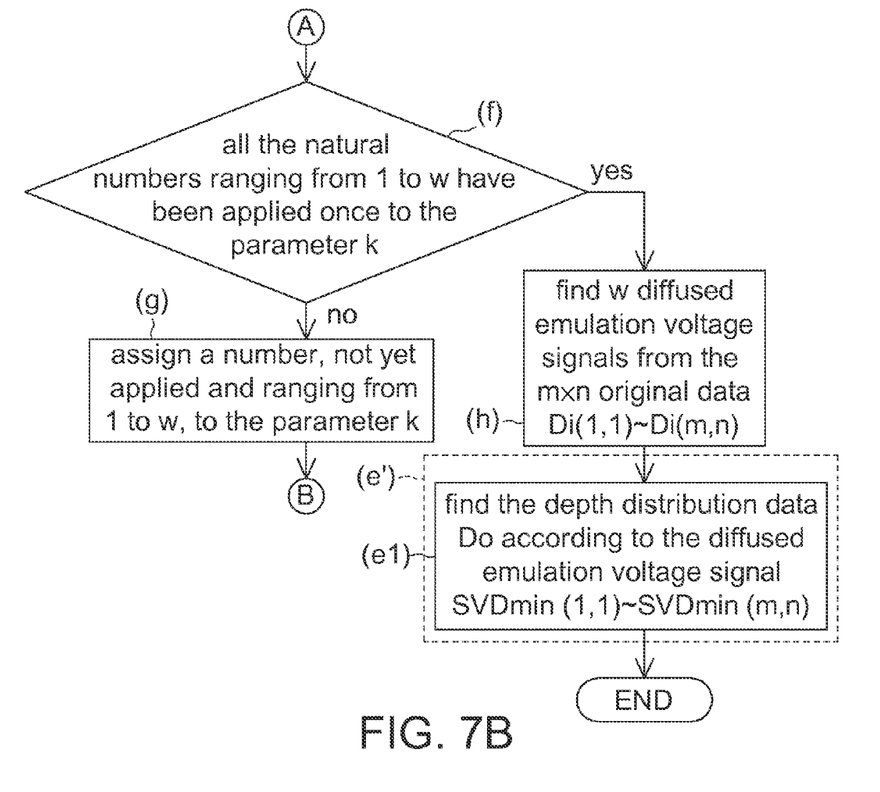

In more details, the image processing method of the second embodiment is different from the image processing method of the first embodiment in that step (a') of the second embodiment further includes sub-steps as illustrated in FIGS. 7A and 7B. Firstly, as indicated in step (a1), the first and the second viewangle image data DvL and DvR are received. For example, the first and the second viewangle image data DvL and DvR are the image data corresponding to the left-eye viewangle and the right-eye viewangle respectively.

Next, as indicated in step (a2), w horizontal parallaxes Dx1, Dx2, . . . , Dxw are determined, and the first original disparity data DIS_k between the first viewangle image data DvL and the second viewangle image data DvR is found when the first viewangle image data DvL has a k-th horizontal parallax Dxk with respect to the second viewangle image data DvR, wherein k is an index of the image matching window and the value of k is a natural number larger than or equal to 1 and smaller than or equal to w. For example, the first original disparity data DIS_k includes m×n original pixel disparity data DIS(1,1,Dxk), DIS(1,2,Dxk), DIS(m,n,Dxk), wherein in step (a2), each of the m×n original pixel disparity data DIS(1,1,Dxk)-DIS(m,n,Dxk) of the first original disparity data DIS_k is found according to the following formula:

$$DvR^-(x,y) = \tfrac{1}{2}[DvR(x,y) + DvR(x-1,y)]$$

$$DvR^+(x,y) = \tfrac{1}{2}[DvR(x,y) + DvR(x+1,y)]$$

$$DvR_{Min}(x,y) = \min(DvR^-(x,y), DvR^+(x,y), DvR(x,y))$$

$$DvR_{Max}(x,y) = \max(DvR^-(x,y), DvR^+(x,y), DvR(x,y))$$

$$DIS(x,y,Dxk) = \max(0, DvL(x,y) - DvR_{Max}(x-Dxk,y), DvR_{Min}(x-Dxk,y) - DvL(x,y))$$

Wherein x and y denote a natural number smaller than or equal to m and a natural number smaller than or equal to n respectively.

Then, as indicated in step (a3), the first original disparity data DIS_k is used as the input data Di', wherein the m×n original data Di'(1,1)-Di'(m,n) are the m×n first original pixel disparity data DIS(1,1,Dxk)-DIS(m,n,Dxk) of the first original disparity data DIS_k which respectively correspond to the m×n pixels I(1,1)-I(m,n).

After step (a3) of the image processing method the present embodiment of the disclosure, steps similar (b')-(d') to steps (b)-(d) of FIG. 3 are correspondingly performed. In step (b'), the m×n original data Di(1,1)-Di(m,n) are converted to generate m×n converted emulation voltage signals SV'(1,1)-SV'(m,n) respectively. In step (c'), a simulation circuit model M' is generated in correspondence to the m×n original data Di(1,1)-Di(m,n), wherein the simulation circuit model M' are resistor networks formed by coupling corresponding nodes and connection devices similar to FIG. 4. In step (d'), m×n converted emulation voltage signals SV'(1,1)-SV'(m,n) respectively are supplied to the m×n spatial data nodes NS'(1,1)-NS'(m,n), so that m×n diffused emulation voltage signals SVD'(1,1,Dxk)-SVD'(m,n,Dxk) are obtained on the diffusion nodes ND'(1,1)-ND'(m,n) of the m×n sub-circuit models M'(1,1)-M'(m,n) respectively.

For example, the sub-circuit models M'(1,1)-M'(m,n) of the present embodiment of the disclosure are different from the sub-circuit models M(1,1)-M(m,n) of the first embodiment in that the resistance value $\omega_{diffuse}$ of each of z diffused connection devices RD1'-RDz' of the sub-circuit model M'(i,j) satisfies the following equation:

$$\omega_{diffuse} = \frac{\alpha}{e^{-\frac{\beta}{1+\gamma G_s(x,y)\|C_t-C_n\|^2}}}$$

Wherein $\alpha$, $\beta$, $\gamma$ denotes predetermined parameters respectively; $G_s(x,y)$ denotes the smoothed gradient of the first viewangle image data DvL; $C_t$ denotes the color information of the corresponding pixel data of the original data; $C_n$ denotes the color information of the corresponding pixel data of the original data received by the sub-circuit models coupled by the diffused connection devices RD1'-RDz'.

After step (d') but before step (e'), the image processing method of the present embodiment of the disclosure further includes steps (f), (g) and (h). In step (f), whether all the natural numbers ranging from 1 to a disparity search window parameter w have been applied once to the parameter k is determined. If not, this implies that the image processing method of the present embodiment of the disclosure has not yet completed the w corresponding first original pixel disparity data DIS_1-DIS_w (and their corresponding converted emulation voltage signals and diffused emulation voltage signals) with respect to all of the w horizontal parallaxes Dx1, Dx2, . . . , Dxw. In step (g), the parameter k is set as a natural number, ranging from 1 to the disparity search window parameter w and having not yet been applied, and steps(a1)-(a3) are repeated to find the next first original disparity data DIS_k corresponding to the next horizontal parallax.

After the next first original disparity data is found, the image processing method of the present embodiment of the disclosure also correspondingly repeats steps (b')-(d') so as to generate a simulation circuit model M' corresponding to the next first original disparity data and obtain the m×n diffused emulation voltage signals SVD'(1,1,Dxk)-SVD'(m,n,Dxk) corresponding to the next first original disparity data.

The above procedures of finding a part or all of the w first original pixel disparity data DIS_1-DIS_w with respect to the w horizontal parallaxes Dx1, Dx2, . . . , Dxw can also be implemented by way of parallel processing.

If the natural numbers ranging from 1 to the disparity search window parameter w have all been applied to the parameter k, this implies that the image processing method of the present embodiment of the disclosure has completed w corresponding first original disparity data DIS_1-DIS_w with respect to all of the w horizontal parallaxes Dx1-Dxw. In other words, w×m×n first original pixel disparity data DIS(1,1,Dx1)-DIS(m,n,Dx1), DIS(1,1,Dx2)-DIS(m,n,Dx2), . . . DIS(1,1,Dxw)-DIS(m,n,Dxw) are correspondingly computed. According to step (h) of the image processing method of the present embodiment of the disclosure, w diffused emulation voltage signals are respectively computed from the circuit models. In the example of the (i,j)-th original data Di(i,j) of the m×n original data Di(1,1)-Di(m,n), the (i,j)-th original data Di(i,j) corresponds to the w diffused emulation voltage signals SVD'(i,j,Dx1), SVD'(i,j,Dx2), SVD'(i,j,Dx3), . . . , SVD'(i,j,Dxw).

Correspondingly, step (e') of image processing method of the present embodiment of the disclosure includes a sub-step (e1), in which the lowest diffused emulation voltage signal $SVD_{min}$(1,1)-$SVD_{min}$(m,n) with a smallest voltage value is found from the w corresponding diffused emulation voltage signals of each of the m×n original data Di'(1,1)-Di'(m,n), so as to find the output pixel disparity data Do'(1,1), Do'(1,2), . . . , Do'(m,n) respectively corresponding to the original data Di'(1,1)-Di'(m,n). In the example of the (i,j)-th original data Di(i,j) of the m×n original data Di(1,1)-Di(m,n), the operation of step (e1) can be expressed in the following formula:

$$Do(i, j) = SVD_{min}(i, j) = \underset{D \times k}{\operatorname{argmin}} SVD'(i, j, D \times k),$$

$$k = 1, 2, \ldots, w$$

Thus, the output pixel disparity data Do'(i,j) corresponding to the original data Di(i,j) can be obtained.

In another example, step (e) further includes sub-step (e2), in which a quadratic function curve is formed from 3 corresponding diffused emulation voltage signals before and after the lowest diffused emulation voltage signal, and the output pixel disparity data Do'(1,1)-Do'(m,n) with decimal level accuracy are found with the minimum of the quadratic function curve. In an operation example, the output pixel disparity data Do'(i,j) corresponding to the (i,j)-th original data Di(i,j) (that is, the lowest diffused emulation voltage signal (i,j)) is the diffused emulation voltage signal SVD'(i,j,5) corresponding to the horizontal parallax Dx5. In sub-step (e2), the diffused emulation voltage signals SVD'(i,j,4), SVD'(i,j,5) and SVD'(i,j,6) corresponding to the horizontal parallax parallaxes Dx4, Dx5 and Dx6 are applied to the following formula so as to find the parameters a, b and c:

$$ax^2+bx+c=y$$

Wherein the output pixel disparity data Do'(i,j) corresponding to the original data Di(i,j) is expressed as:

$$Do(i, j) = \frac{-b}{2a}$$

Based on the above steps(a')-(e') and steps (f)-(h), the image processing method of the present embodiment of the disclosure correspondingly generates the depth distribution data Do' according to the first original disparity data DIS_1-DIS_w of the first viewangle image data DvL (such as the left-eye viewangle image data) with respect to the second viewangle image data DvR (such as the right-eye viewangle image data).

In the present embodiment of the disclosure, the image processing method of the present embodiment of the disclosure generates the depth distribution data Do' according to the first original disparity data DIS_1-DIS_w of the first viewangle image data DvL with respect to the second viewangle image data DvR. However, the image processing method of the present embodiment of the disclosure is not limited to such exemplification. In another example, the image processing method of the present embodiment of the disclosure may correspondingly generate the depth distribution data Do' according to the second original disparity data DIS'_1-DIS'_w of the second viewangle image data DvR (such as the right-eye viewangle image data) with respect to the first viewangle image data DvL (such as the left-eye viewangle image data) through the operations similar to the above embodiment.

In yet another example, the image processing method of the present embodiment of the disclosure further increases the precision of the depth distribution data according to the consistence between the depth distribution data Do' of the first viewangle image data DvL with respect to the second viewangle image data DvR and the depth distribution data Do" of the second viewangle image data DvR with respect to the first viewangle image data DvL. For example, with respect to the first viewangle depth distribution data Do' and the second viewangle depth distribution data Do", the output pixel disparity data satisfying the following formula are reserved:

$$|Do'(x,y)-Do''(x-Do'(x,y),y)| \leq 1$$

In other words, only the consistent output pixel disparity data of the depth distribution data Do' are reserved.

For the output pixel disparity data not satisfying the above equation, the missing data can be replaced by any image inpainting technologies. In the present embodiment of the disclosure, the missing data are replaced by the minimum of the closest output pixel disparity data at the two sides of the output pixel disparity data that satisfy the above equation (the data that satisfy the above equation refer to the data that are reserved).

Figure 8:
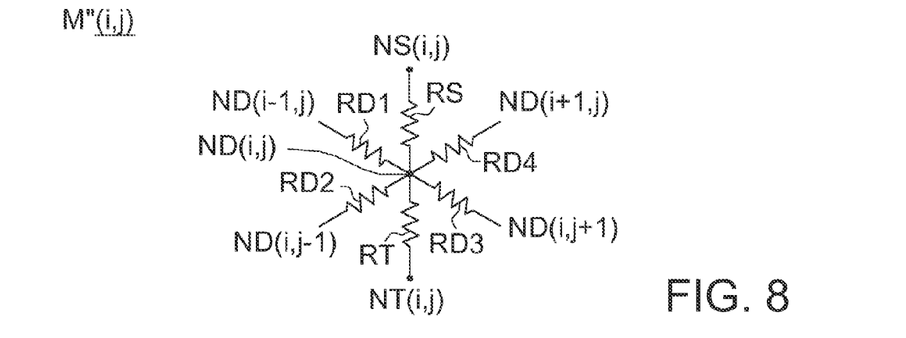
FIG. 8 shows a circuit diagram of a sub-circuit model according to a second embodiment of the disclosure.

In step (b') of the image processing method of the present embodiment of the disclosure, the circuit structures of the established m×n sub-circuit models M'(1,1)-M'(m,n) are illustrated in FIG. 3. However, the image processing method of the present embodiment of the disclosure is not limited to such exemplification. In another example, each of the m×n sub-circuit models M"(1,1)-M"(m,n) established by the image processing method further includes time data nodes and time data diffused connection devices. Let the (i,j)-th simulation circuit model M"(i,j) of the simulation circuit models M"(1,1)-M"(m,n) be taken for example. The circuit structure of the (i,j)-th simulation circuit model M"(i,j) is different from the circuit structure illustrated in FIG. 3 in that the circuit structure further includes time data nodes NT (i,j) and time data diffused connection devices RT (i,j) as illustrated in FIG. 8.

The time data diffused connection devices RT (i,j) are coupled between the time data nodes NT (i,j) and the diffusion nodes ND(i,j), and each of the resistance values $\omega_{time}$ of the time data diffused connection devices RT (i,j) satisfies the following equation:

$$\omega_{time} = \frac{\lambda}{e^{-\sigma\|C_{pre}-C_{cur}\|^2}}$$

Wherein $\lambda$ and $\sigma$ denote predetermined parameters; $C_{cur}$ denotes the color information of the corresponding pixel data of each of the original data (such as each pixel data of the first viewangle image data DvL) at the current frame time; $C_{pre}$ denotes the color information of the corresponding pixel data of each of the original data at the previous frame time. Thus, the image processing method of the present embodiment of the disclosure can also generate the depth distribution data Do' with reference to the color information related to the previous frame and the next frame.

In addition, the depth distribution data Do' can also be generated through the aid of monocular cues such as linear perspective. Also, the semi-global and global matching mechanism such as dynamic programming or belief propagation can be used in the image processing method of the present embodiment of the disclosure for increasing the matching accuracy of the first and the second viewangle image data DvL and DvR.

In the present embodiment of the disclosure, the image processing method directly uses the first and the second viewangle image data DvL and DvR to perform relevant matching process. However, the image processing method of the present embodiment of the disclosure is not limited to such exemplification. In other examples, to reduce the overall data computational volume, the image processing method of the present embodiment of the disclosure can reduce resolution level before performing the matching process related to the first and the second viewangle image data DvL and DvR. In other words, the matching processing is performed to the first and the second viewangle image data DvL and DvR with reduced resolution, and the obtained depth distribution data have lower resolution. After that, the depth distribution data are enlarged so that the depth distribution data with the same resolution can be obtained given that the data computational volume has been largely reduced.

For example, the above process of enlarging the depth distribution data can be implemented by the procedures of the image processing method of FIG. 1. In an operating example, the to-be-enlarged depth distribution data have such as s×t original data, and are to be enlarged as the depth distribution data with s'×t' resolution, wherein s, t, s' and t' are natural numbers larger than 1, and s and t respectively satisfy: s<s' and t<t'. In the present operation example, the image processing method of the present embodiment of the disclosure generates a simulation circuit model including s×t data nodes and s'×t' diffusion nodes, and obtains s'×t' diffusion node diffused emulation voltage signals via the voltage diffusion among the s'×t' diffusion nodes. Thus, the image processing method of the present embodiment of the disclosure can correspondingly increase the resolution of the data via above circuit simulation.

Third Embodiment

The image processing method of the present embodiment of the disclosure generates corresponding depth distribution data of image according to the data inputted by the user. The present embodiment is different from the first embodiment and the second embodiment in that a user interface is provided for receiving a user operation event inputted by the user. The image processing method of the present embodiment of the disclosure refers to the user operation event inputted by the user, and selectively increases/deceases a part of nodes and diffused connection devices of the m×n sub-circuit models, or selectively sets the corresponding voltage signal on each of the spatial data nodes and the corresponding resistance values of the diffused connection devices of the m×n sub-circuit models. Moreover, the image processing method of the present embodiment of the disclosure further correspondingly and respectively drives the simulation circuit model to incur the redistribution of corresponding voltage levels, so that the diffused emulation voltage signals controlled by the user can be respectively obtained on the diffusion nodes of the simulation circuit model.

For example, the abovementioned user interface can provide image segmentation tools and brush tools. The image segmentation tools enable the user to selectively perform object segmentation on the input data in response to the user operation event to find the object distribution information from the input data. The brush tools enable the user to selectively assign numeric values to corresponding input data. During step (c) of establishing the simulation circuit model, the image processing method of the present embodiment of the disclosure can further refer to the above information to increase/decrease the data nodes or diffusion nodes, or set the resistance values to the diffused connection devices and the spatial data connection devices.

In an operating example, during step (c) of establishing the simulation circuit model, the image processing method refers to the object distribution information to set the resistance values to the diffused connection devices first. When the object distribution information indicates that two diffusion nodes belong to the same object segmentation, the image processing method of the present embodiment of the disclosure sets the resistance values to the diffused connection devices corresponding to the segmentation by a method similar to that of the first embodiment. When the object distribution information indicates that the two diffusion nodes do not belong to the same object segmentation, the image processing method of the present embodiment of the disclosure correspondingly sets the resistance values of the diffused connection devices between the segmentation as a maximum value to assure that there are lower voltage diffusion among the diffusion nodes belonging to different object segmentations.

In step (c) of establishing a simulation circuit model, the image processing method continues to establish data nodes and data connection devices according to the numeric values assigned by the user (corresponding to particular diffusion nodes). For the diffusion nodes to which the user does not assign any original data, the image processing method does not establish related data nodes or data connection devices. Thus, in step (c) of the image processing method, a corresponding simulation circuit model is established with reference to the above information of object segmentation and user-assigned numeric values to perform corresponding image processing.

Fourth Embodiment

The image processing method of the present embodiment of the disclosure is used in the application of image smoothing for generating smoothed image data from the inputted image data.

The image processing method of the present embodiment of the disclosure is used for generating image smoothing data Do" according to input data Di". For example, the input data Di" include m×n pixel data I(1,1)-I(m,n) corresponding to m×n pixels, wherein the m×n pixel data I(1,1)-I(m,n) include the first sub-pixel data Isub1(1,1)-Isub1($m,n$), and the image smoothing data Do" include the m×n smoothed sub-pixel data Ism1(1,1)-Ism1($m,n$) corresponding to the m×n pixels.

Figure 9:
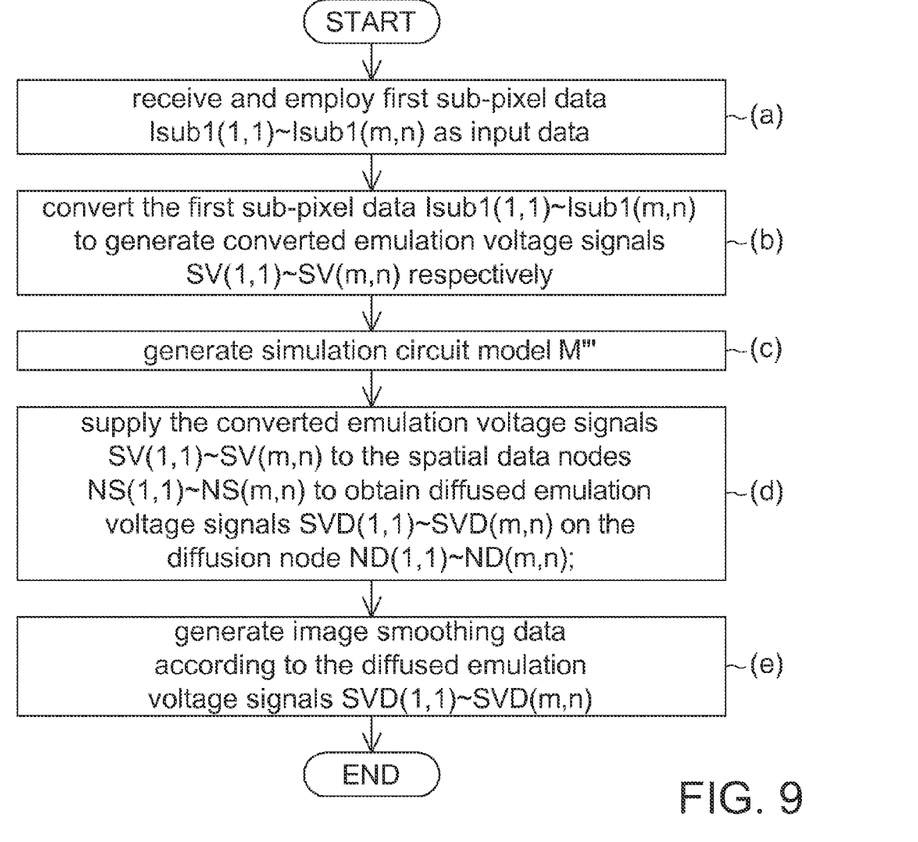
FIG. 9 shows a flowchart of an image processing method according to a fourth embodiment of the disclosure.

Referring to FIG. 9, a flowchart of an image processing method according to a fourth embodiment of the disclosure is shown. Firstly, as indicated in step (a), m×n first sub-pixel data Isub1(1,1)-Isub1($m,n$) are received using a computer, and used as input data. Next, as indicated in step (b), the m×n first sub-pixel data Isub1(1,1)-Isub1($m,n$) are correspondingly converted, using the computer, to generate m×n converted emulation voltage signals SV(1,1)-SV(m,n) respectively.

Then, as indicated in step (c), a simulation circuit model M''' corresponding to the m×n first sub-pixel data Isub1(1,1)-Isub1($m,n$) is generated using the computer. For example, the simulation circuit model M''' includes m×n sub-circuit models M'''(1,1)-M'''($n,m$), each including a data node NS, a diffusion node ND, a data diffused connection device RS and x diffused connection devices RD1-RDx. The data diffused connection devices RS is coupled between the data node NS and the diffusion node ND. One end of each of the diffused connection devices RD is coupled to the diffusion node ND, the other end is coupled to another sub-circuit model of the m×n sub-circuit models M'''(1,1)-M'''($m,n$), wherein x is a natural number.

Afterwards, as indicated in step (d), the converted emulation voltage signals SV(1,1)-SV(m,n) corresponding to the m×n first sub-pixel data Isub1(1,1)-Isub1($m,n$) are supplied, using the computer, to the data node NS for respectively driving the m×n sub-circuit models M'''(1,1)-M'''($m,n$) to incur the re-distribution of voltage levels, so that m×n diffused emulation voltage signals SVD(1,1)-SVD(m,n) are respectively obtained on the diffusion node ND of the m×n sub-circuit models M'''(1,1)-M'''($n,m$).

After that, as indicated in step (e), image smoothing data Do" including m×n smoothed sub-pixel data Ism1(1,1)-Ism1($m,n$) are generated according to the m×n diffused emulation voltage signals SVD(1,1)-SVD(m,n).

Though only the operation of generate image smoothing data corresponding to the first sub-pixel data Isub1(1,1)-Isub1($m,n$) has been illustrated in the previous paragraphs, the operations of generate image smoothing data corresponding to other sub-pixel data are similar to that of the first sub-pixel data Isub1(1,1)-Isub(m,n) and can be obtained accordingly.

In an example, each of the m×n pixel data I(1,1)-I(m,n) such as further respectively includes second sub-pixel data Isub2(1,1)-Isub2($m,n$) and third sub-pixel data and Isub3(1,1)-Isub3($m,n$). The image processing method of the present embodiment of the disclosure further find corresponding smoothed sub-pixel data Ism2(1,1)-Ism2($m,n$) and Ism3(1,1)-IsM(m,n) through the procedures substantially similar to that of the above steps(a)-(e).

Fifth Embodiment

The image processing method disclosed in the above embodiments of the disclosure can be implemented by matured computer readable programs and recorded in corresponding computer readable medium. Thus, the user can access the above computer readable medium with a computer processor and execute the image processing method disclosed in the above embodiments of the disclosure with the computer readable programs stored in the recording medium.

Figure 10:
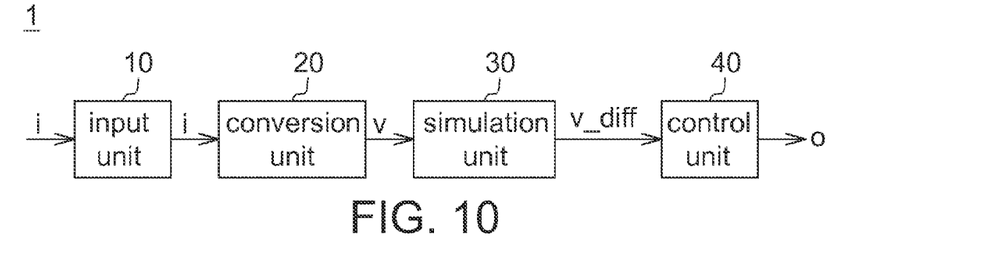
FIG. 10 shows a block diagram of an image processing apparatus according to an embodiment of the disclosure.

For example, the image processing method disclosed in the above embodiments of the disclosure can be implemented by the image processing apparatus 1 of FIG. 10. In greater details, the image processing apparatus 1 includes an input unit 10, a conversion unit 20, a simulation unit 30 and a control unit 40. In an operating example, the input unit 10, the conversion unit 20, the simulation unit 30 and the control unit 40 of the image processing apparatus 1 are all realized by software modules. In other words, the above units are realized by executing corresponding programs with a processor.

The input unit 10 receives input data including a number of original data Di. The conversion unit 20 converts the original data to generate a number of converted emulation voltage signals v. The simulation unit 30 establishes a corresponding simulation circuit model, which includes at least a spatial data node, at least a diffusion node and at least a connection device. The control unit 40 supplies a part or all of the converted emulation voltage signals to the at least a diffusion node to achieve voltage diffusion among the at least a spatial data node and the at least a diffusion node via at least a connection device, so that at least a diffused emulation voltage signal is obtained on the at least a diffusion node v_diff. The control unit processed image data o are generated according to at least a diffused emulation voltage signal v_diff.

The above embodiments of the disclosure are related to an image processing method. In comparison to some of the conventional depth data generation method, the image processing method disclosed in the embodiments of the disclosure has the advantage of generating depth data with higher accuracy. In comparison to conventional image smoothing methods, the image processing method disclosed in the embodiments of the disclosure has the advantage of effectively smoothing the input image.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method executed by a computer, comprising:
   receiving a plurality of original data using the computer;
   converting the original data, using the computer, into a plurality of converted emulation voltage signals;
   establishing a simulation circuit model using the computer, the simulation circuit model comprises at least a data node, at least a diffusion node and at least a connection device, wherein the at least a connection device is coupled to a part or all of the at least a data node and the at least a diffusion node;
   supplying the a part or all of the converted emulation voltage signals, using the computer, to the at least a data node to achieve voltage diffusion among at least a spatial data node and the at least a diffusion node via the at least a connection device, so that at least a diffused emulation voltage signal is obtained on the at least a diffusion node; and
   generating at least a processed image data, using the computer, according to the at least a diffused emulation voltage signal.

2. The image processing method according to claim 1, wherein the original data are depth information related to an image data.

3. The image processing method according to claim 1, wherein the original data are information related to the received user input data.

4. The image processing method according to claim 1, wherein the connection device carries resistance properties with a corresponding resistance value.

5. The image processing method according to claim 4, wherein the resistance value of the connection device relates to a color information of an image data.

6. The image processing method according to claim 4, wherein the resistance value of the connection device relates to a user input data.

7. The image processing method according to claim 4, wherein the resistance value of the connection device is adjusted via the smoothed gradient of an image.

8. The image processing method according to claim 1, wherein the data node relates to image pixel distribution or frame time.

9. The image processing method according to claim 1, wherein the original data are color information of an image.

10. The image processing method according to claim 1, wherein the step of receiving a plurality of original data further comprises:
    receiving and using an initial depth data as an input data, wherein the initial depth data comprises the original data corresponding to a plurality of pixels.

11. The image processing method according to claim 10, wherein the step of establishing a simulation circuit model further comprises:
    providing a plurality of the at least diffusion nodes to the simulation circuit model, wherein, corresponding to each of the at least diffusion nodes, the at least a connection device comprises x diffused connection devices, one end of each of the diffused connection devices is coupled to the corresponding at least a diffusion node, the other end is coupled to another diffusion node of the at least a diffusion node, and x is a natural number.

12. The image processing method according to claim 1, wherein the step of receiving a plurality of original data further comprises:
    (a1) receiving a first viewangle image data and a second viewangle image data;
    (a2) computing a first original disparity data between the first viewangle image data and the second viewangle image data when the first viewangle image data has a k-th horizontal parallax Dxk with respect to the second viewangle image data, wherein k is larger than or equal to 1 and smaller than or equal to w, wherein k and w are natural numbers; and
    (a3) using the first original disparity data as the input data.

13. The image processing method according to claim 12, wherein the step of establishing a simulation circuit model further comprises:
    providing a plurality of the at least diffusion nodes to the simulation circuit model, wherein, corresponding to each of the at least diffusion nodes, the at least a connection device comprises x diffused connection devices, one end of each of the diffused connection devices is coupled to the corresponding at least diffusion nodes, the other end is coupled to another diffusion node of the at least diffusion nodes, and x is a natural number.

14. The image processing method according to claim 12, wherein the method further comprises:
    setting the numeric value k as a natural number ranging from 1 to the disparity search window parameter w, and correspondingly repeating steps(a1)-(a3) by way serial or parallel processing so as to find and use the next first original disparity data as the input data;
    wherein, relevant steps for generating the simulation circuit model corresponding to the next first original disparity data and finding the at least a diffused emulation voltage signal corresponding to the next first original disparity data are correspondingly repeated.

15. The image processing method according to claim 14, wherein the method further comprises:
    finding w at least diffused emulation voltage signals from the at least a diffusion node when the processing of all numeric values k corresponding to the natural numbers ranging from 1 to the disparity search window parameter w is completed;
    wherein, step of generating at least a processed image data comprises:
    (e1) finding the processed image data according to a smallest diffused emulation voltage signal of the w at least diffused emulation voltage signals which has a smallest voltage value.

16. The image processing method according to claim 15, wherein in step (e1), the method further comprises:
   determining whether the smallest diffused emulation voltage signal corresponds to a reference diffused emulation voltage signal so as to verify the smallest diffused emulation voltage signal, wherein the reference diffused emulation voltage signal is related to the disparity data of the second viewangle image data with respect to the first viewangle image data; and
   when the lowest diffused emulation voltage signal corresponds to the reference diffused emulation voltage signal, the smallest diffused emulation voltage signal deduced from the reference diffused emulation voltage signal is used as the processed image data.

17. The image processing method according to claim 12, wherein the step of establishing a simulation circuit model further comprises:
   providing a time data node to the at least a data node, wherein, corresponding to the time data node, the at least a connection device comprises a time data connection device coupled between the time data node and the at least a diffusion node.

18. The image processing method according to claim 1, wherein the step of establishing a simulation circuit model further comprises:
   selectively determining the numbers of the at least a data node, the at least a diffusion node and the at least a connection device of the simulation circuit model in response to a first user operation event, wherein the connection device carries resistance properties with a corresponding resistance value;
   selectively setting the voltage signal corresponding to at least a data node in the simulation circuit model and the resistance value of the at least a connection device in response to a second user operation event.

19. The image processing method according to claim 1, wherein the step of receiving a plurality of original data further comprises:
   receiving a plurality of the sub-pixel data corresponding to a plurality of pixels and using the sub-pixel data as the original data corresponding to the pixels;
   wherein, the processed image data generated according to the original data obtained from the sub-pixel data is a smoothed image data.

20. The image processing method according to claim 1, wherein the step of receiving a plurality of original data further comprises:
   receiving a first frame data corresponding to a first screen resolution and using the first frame data as the input data;
   wherein, the processed image data generated according to the input data obtained from the first frame data is a scaled image data corresponding to a second screen resolution.

21. The image processing method according to claim 1, wherein the step of establishing a simulation circuit model further comprises:
   providing a spatial data node to the at least a data node, wherein, corresponding to the spatial data node, the at least a connection device comprises a spatial data connection device coupled between the spatial data node and the at least a diffusion node.

22. An image processing apparatus, comprising:
   an input unit executed by a processor used for receiving an input data, wherein the input data comprises a plurality of original data;
   a conversion unit executed by the processor used for converting the original data into a plurality of converted emulation voltage signals;
   a simulation unit executed by the processor used for establishing a simulation circuit model comprising at least a data node, at least a diffusion node and at least a connection device, wherein the at least a connection device carries resistance properties with a corresponding resistance value is coupled to a part or all of the at least a data node and the at least a diffusion node; and
   a control unit executed by the processor used for supplying the a part or all of the converted emulation voltage signals to the at least a diffusion node to achieve voltage diffusion among at least a spatial data node and the at least a diffusion node via the at least a connection device, so that at least a diffused emulation voltage signal is obtained on the at least a diffusion node, wherein the control unit generates a processed image data according to the at least a diffused emulation voltage signal.

23. The image processing apparatus according to claim 22, wherein the input unit receives an initial depth data, and uses the initial depth data as the input data, and the initial depth data comprises the original data corresponding to a plurality of pixels.

24. The image processing apparatus according to claim 23, wherein the simulation unit provides a plurality of the at least diffusion nodes to the simulation circuit model;
   wherein, corresponding to each of the at least diffusion nodes, the at least a connection device comprises x diffused connection devices, one end of each of the diffused connection devices is coupled to the corresponding at least diffusion nodes, the other end is coupled to another diffusion node of the at least diffusion nodes, and x is a natural number.

25. The image processing apparatus according to claim 22, wherein the input unit comprises:
   a receiver used for receiving a first viewangle image data and a second viewangle image data; and
   an operator used for finding a first original disparity data between the first viewangle image data and the second viewangle image data when the first viewangle image data has a k-th horizontal parallax Dxk with respect to the second viewangle image data, wherein k is larger than or equal to 1 and smaller than or equal to w, wherein k and w are natural numbers;
   wherein, the processor uses the first original disparity data as the input data, and the original data are a plurality of first original pixel disparity data of the first original disparity data which respectively correspond to a plurality of pixels.

26. The image processing apparatus according to claim 25, wherein the simulation unit provides a plurality of at least diffusion nodes to the simulation circuit model;
   wherein, corresponding to each of the at least diffusion nodes, the at least a connection device comprises x diffused connection devices, one end of each of the diffused connection devices is coupled to the corresponding at least diffusion nodes, the other end is coupled to another diffusion node of the at least diffusion nodes, and x is a natural number.

27. The image processing apparatus according to claim 25, wherein the control unit sets the numeric value k as a natural number ranging from 1 to the disparity search window parameter w, and correspondingly drives the input unit by way serial or parallel processing so as to find and use the next first original disparity data as the input data;

wherein, the conversion unit and the control unit execute corresponding operations to generate the next first original disparity data and obtain the at least a diffused emulation voltage signal corresponding to the next first original disparity data.

28. The image processing apparatus according to claim 27, wherein when the processing of all numeric values k corresponding to the natural numbers ranging from 1 to the disparity search window parameter w is completed, the control unit finds w at least diffused emulation voltage signals from the at least a diffusion node, and finds the processed image data according to a smallest diffused emulation voltage signal of the w at least diffused emulation voltage signals which has a smallest voltage value.

29. The image processing apparatus according to claim 28, wherein the control unit further determines whether the smallest diffused emulation voltage signal corresponds to a reference diffused emulation voltage signal so as to verify the smallest diffused emulation voltage signal, and the reference diffused emulation voltage signal is related to the disparity data of the second viewangle image data with respect to the first viewangle image data;

wherein, when the lowest diffused emulation voltage signal corresponds to the reference diffused emulation voltage signal, the control unit used the smallest diffused emulation voltage signal deduced from the reference diffused emulation voltage signal as the processed image data.

30. The image processing apparatus according to claim 25, wherein the simulation unit provides a time data node to the at least a data node, and, corresponding to the time data node, the at least a connection device comprises a time data connection device coupled between the time data node and the at least a diffusion node.

31. The image processing apparatus according to claim 22, wherein the control unit, in response to a first user operation event, selectively determines the numbers of the at least a data node, the at least a diffusion node and the at least a connection device of the simulation circuit model, and the control unit, in response to a second user operation event, further selectively sets the voltage signal corresponding to the at least a spatial data node of the simulation circuit model and the resistance value of the at least a connection device of the simulation circuit model.

32. The image processing apparatus according to claim 22, wherein the input unit receives a plurality of sub-pixel data corresponding to a plurality of pixels, and uses the sub-pixel data as the original data corresponding to the pixels;

wherein, the processed image data generated according to the original data obtained from the sub-pixel data is a smoothed image data.

33. The image processing apparatus according to claim 22, wherein the input unit receives a first frame data corresponding to a first screen resolution, and uses the first frame data as the input data;

wherein, the processed image data generated according to the input data obtained from the first frame data is a scaled image data corresponding to a second screen resolution.

34. The image processing apparatus according to claim 22, wherein the simulation unit provides a spatial data node to the at least a data node, and, corresponding to the spatial data node, the at least a connection device comprises a spatial data connection device coupled between the spatial data node and the at least a diffusion node.

* * * * *